United States Patent
Spadotto et al.

(10) Patent No.: US 9,974,247 B2
(45) Date of Patent: May 22, 2018

(54) SOLAR PUMP DEVICE FOR LIQUIDS WITH MOVABLE TANK

(71) Applicant: CLABER S.p.A., Fiume Veneto (PN) (IT)

(72) Inventors: Dario Spadotto, Pordenone (IT); Gaetano Franchini, Fiume Veneto (IT)

(73) Assignee: CLABER S.P.A., Fiume Veneto (PN) (IT)

( * ) Notice: Subject to any disclaimer, the term of this patent is extended or adjusted under 35 U.S.C. 154(b) by 0 days. days.

(21) Appl. No.: 15/284,733

(22) Filed: Oct. 4, 2016

(65) Prior Publication Data

US 2017/0094917 A1    Apr. 6, 2017

(30) Foreign Application Priority Data

Oct. 6, 2015    (IT) .................. 202015000058631

(51) Int. Cl.

| | | |
|---|---|---|
| *A01G 25/14* | (2006.01) | |
| *A01G 27/00* | (2006.01) | |
| *A01G 25/09* | (2006.01) | |
| *F04D 25/06* | (2006.01) | |
| *F04D 13/06* | (2006.01) | |

(52) U.S. Cl.
CPC .......... *A01G 25/145* (2013.01); *A01G 25/09* (2013.01); *A01G 27/00* (2013.01); *A01G 27/001* (2013.01); *A01G 27/003* (2013.01); *A01G 27/008* (2013.01); *F04D 13/068* (2013.01); *F04D 25/0673* (2013.01)

(58) Field of Classification Search
CPC ...... A01G 25/09; A01G 25/145; A01G 27/00; A01G 27/001; A01G 27/003; A01G 27/006; A01G 27/008; A01G 27/02; F04D 13/068; F04D 25/0673

See application file for complete search history.

(56) References Cited

U.S. PATENT DOCUMENTS

| | | | | |
|---|---|---|---|---|
| 3,797,743 A | * | 3/1974 | Kommers | A01G 25/09 222/609 |
| 4,193,518 A | * | 3/1980 | Holmes | A45F 3/20 222/105 |

(Continued)

FOREIGN PATENT DOCUMENTS

| | | | | |
|---|---|---|---|---|
| EP | 2 420 323 A1 | | 2/2012 | |
| GB | 2472270 A | * | 2/2011 | A01G 27/00 |
| WO | 95/33926 A2 | | 12/1995 | |

OTHER PUBLICATIONS

European Search Report, dated Jan. 24, 2017 (4 pages).

*Primary Examiner* — Nicholas J Weiss
(74) *Attorney, Agent, or Firm* — Jacobson Halman, PLLC.

(57) ABSTRACT

A pumping device for liquids is described which comprises a tank for liquids, from which a feeding pipe of a pump with a solar panel draws. The tank consists of a supporting frame with tubular uprights and upper and lower horizontal connection lengths, which supports and surrounds a flexible bag for containing liquids and has an upper connection crossbar of the upper horizontal lengths of the supporting frame, on which the pump with solar panel is mounted. The bag has a lower filling hole or mouth, in which the feeding pipe can be inserted and an overflow hole made in the upper of part of its side wall in position lower than said mouth.

5 Claims, 5 Drawing Sheets

(56) References Cited

U.S. PATENT DOCUMENTS

| | | | | |
|---|---|---|---|---|
| 4,744,334 | A * | 5/1988 | McAnally | A01K 7/00 119/78 |
| 4,947,988 | A * | 8/1990 | Schutz | B65D 77/0466 206/386 |
| 5,382,117 | A * | 1/1995 | Rings | A47L 15/44 222/105 |
| 6,981,613 | B1 * | 1/2006 | Kamisugi | A01G 25/145 222/105 |
| 8,545,194 | B2 * | 10/2013 | Irving | F04B 17/006 417/411 |
| 9,494,159 | B2 * | 11/2016 | Bryditzki | F04B 23/14 |
| D782,971 | S * | 4/2017 | Franchini | D13/102 |
| 2005/0086738 | A1 * | 4/2005 | Gragtmans | A47K 3/288 4/622 |
| 2007/0048152 | A1 * | 3/2007 | Conally | F04B 17/006 417/411 |
| 2009/0020073 | A1 * | 1/2009 | Hansen | A01K 5/0291 119/51.11 |
| 2010/0276513 | A1 * | 11/2010 | Huff | A01G 25/09 239/266 |
| 2014/0356198 | A1 * | 12/2014 | Rulli | F04B 17/006 417/360 |
| 2016/0377069 | A1 * | 12/2016 | Spadotto | A01G 25/00 417/411 |

* cited by examiner

SOLAR PUMP DEVICE FOR LIQUIDS WITH MOVABLE TANK

BACKGROUND OF THE INVENTION

The present invention relates to a solar pump device for liquids with movable tank, in particular for pumping water for gardening.

Italian application n. 102015000026737 filed on 23 Jun. 2015 by the Applicant describes a pumping device for liquids, also named "solar pump", which uses a solar panel for maintaining charged a rechargeable battery which supplies a pump adapted to draw water from a tank and to dispense it to the surrounding spaces.

In particular, devices of that type are used for irrigating green areas far from usable water sources.

Obviously, for such a use, it is important for the pumping device to be simple to construct and easy to transport from one position to another, even not very close.

BRIEF SUMMARY OF THE INVENTION

It is the object of the present invention to make a pumping device for liquids of the solar pump type which is simple and easy to transport from various sites of use.

According to the present invention, such an object is achieved by a pumping device comprising a tank for liquids, from which a feeding pipe of a pump with a solar panel draws, characterized in that the tank consists of a supporting frame with tubular uprights and upper and lower horizontal connection lengths, which supports and surrounds a flexible bag for containing liquids and has an upper connection crossbar of the upper horizontal lengths of the supporting frame, on which the solar panel pump is mounted.

It is apparent that the use of a tubular upright frame in combination with a simple flexible bag and a solar panel pump mounted on the top of the aforesaid frame makes the pumping device simple and light, easy to move from one site of use to another, in which it is sufficient to fill the bag with the desired liquid to have the device ready for pumping and dispensing liquid, e.g. water for gardening purposes.

BRIEF DESCRIPTION OF THE DRAWINGS

The features of the present invention will be more apparent from the following description of a practical embodiment thereof, in which.

Figure 1:
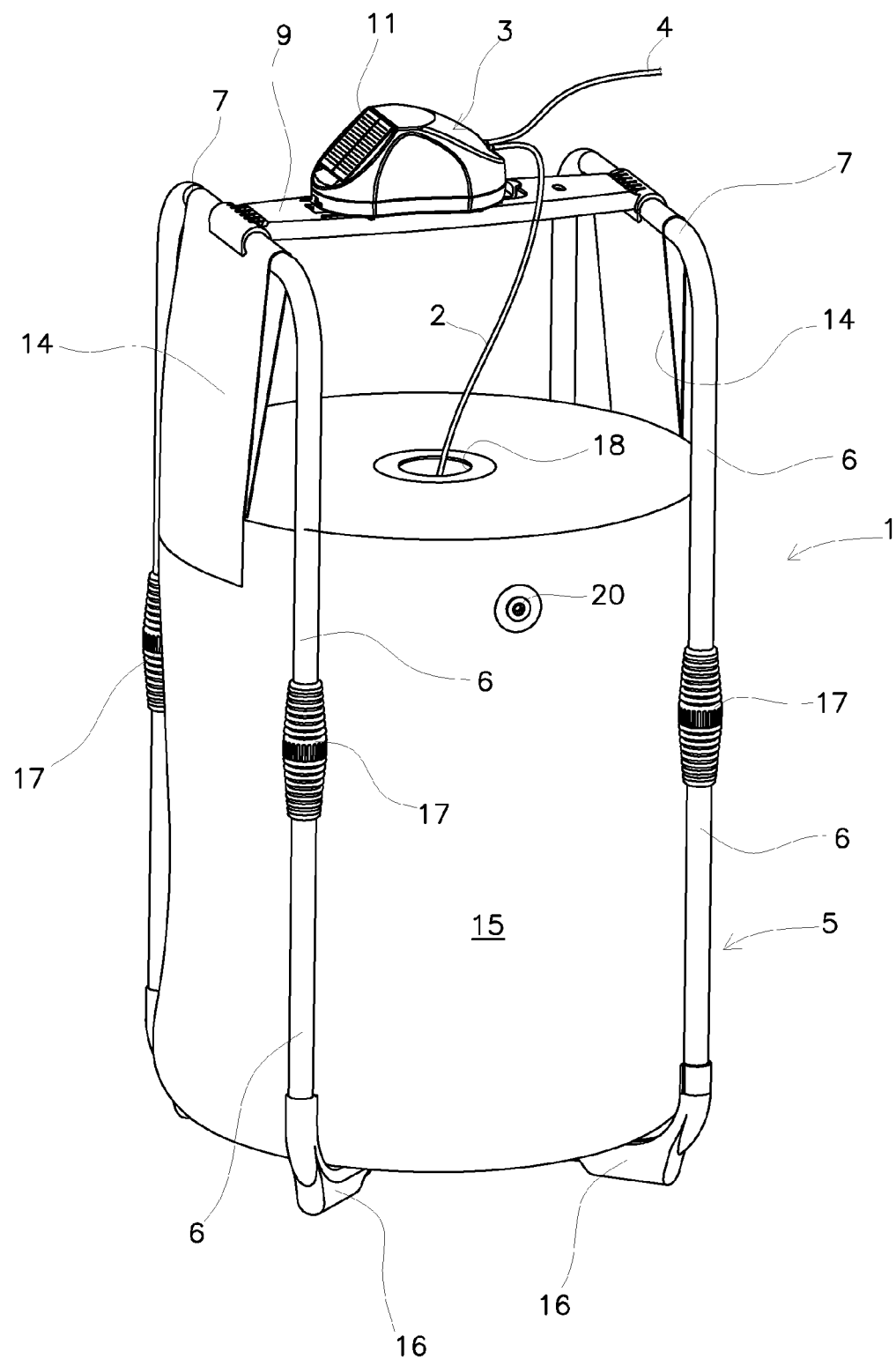
FIG. 1 shows a first perspective view of a pumping device according to the invention.

The pumping device shown in the drawings comprises a tank 1 for liquids of various kind, in particular water, from which a feeding pipe 2 of a solar panel pump 3 draws, provided with a dispensing pipe 4 connectable to dispensing devices of various kind (not shown), in particular water dispensers for gardening.

Figure 2:
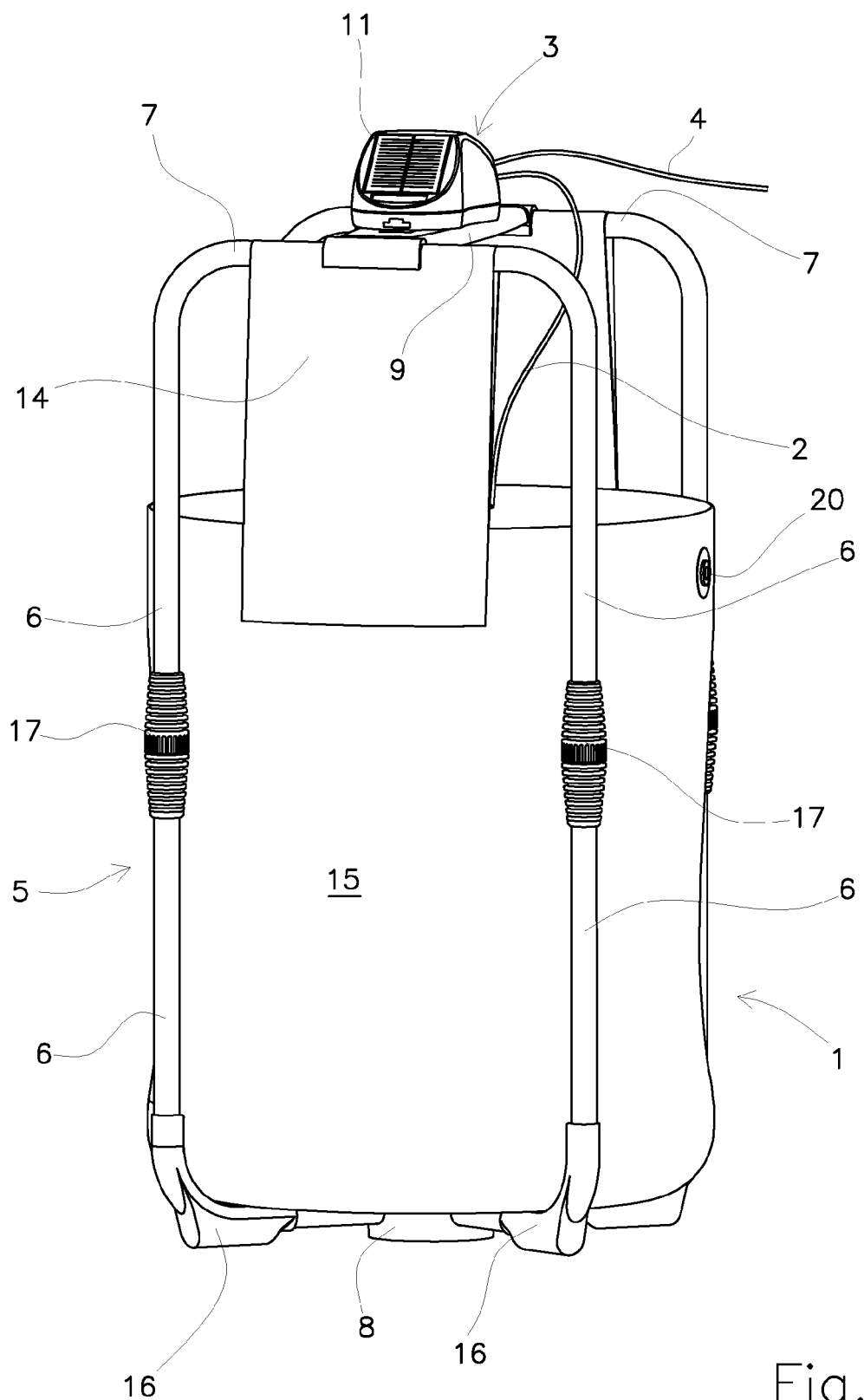
FIG. 2 shows a second perspective view of the same device.
Figure 3:
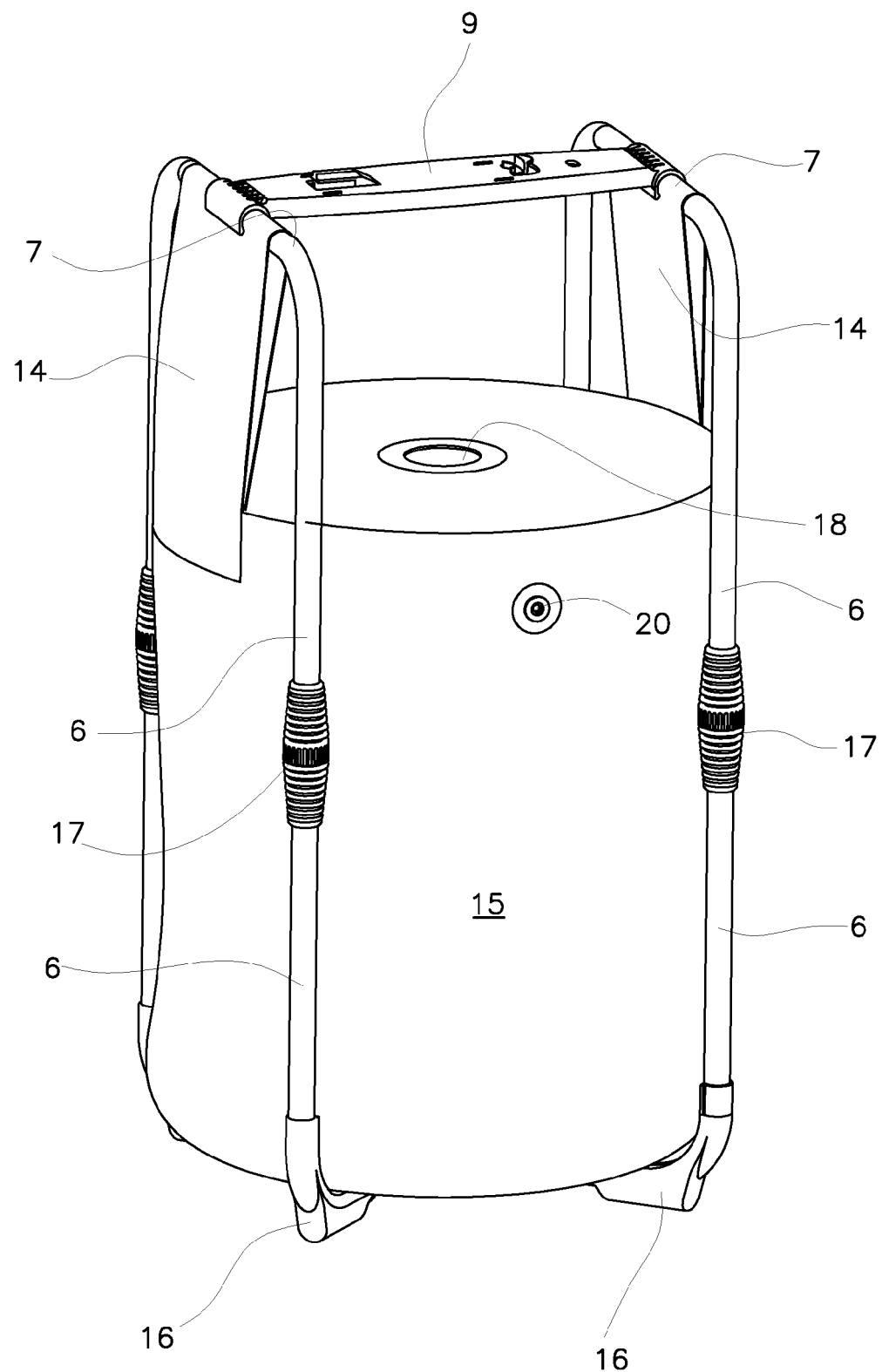
FIG. 3 shows a perspective view of the tank of the aforesaid device similar to that in FIG. 1.
Figure 4:
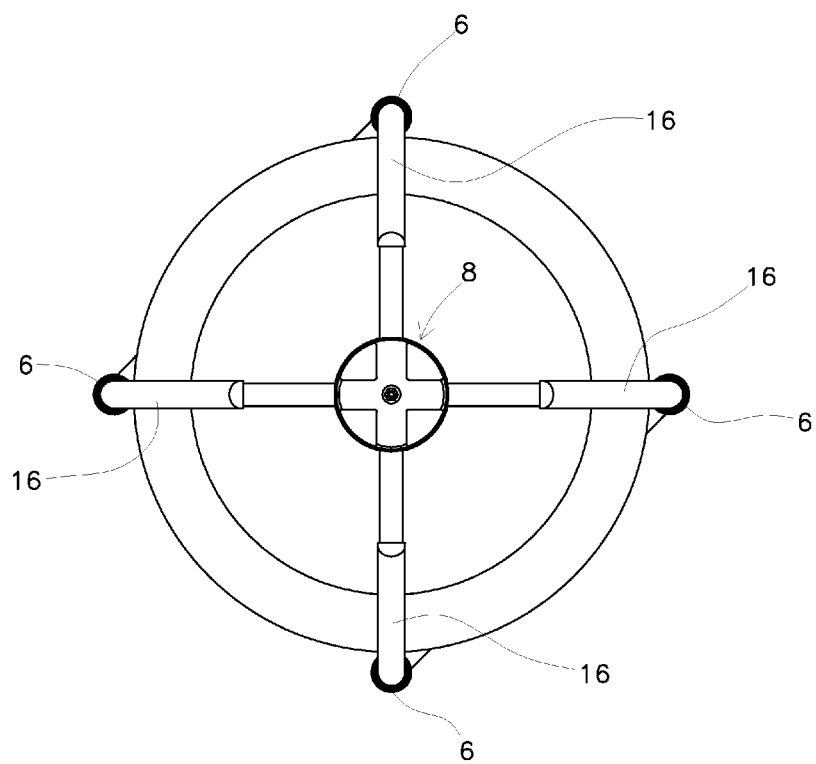
FIG. 4 shows a plan view of the tank from the bottom.

The tank 1, shown separately in FIG. 3, comprises a metal frame 5 formed by vertical tubular uprights 6, four by way of example, which are joined on the top in pairs by means of horizontal tubular lengths 7 (FIGS. 1-3), while on the bottom horizontal tubular stretches 16 radially converge towards a confluence area 8, shown in FIG. 4. Each upright 6 is made in two parts joined in aligned position by joining elements 17.

Figure 5:
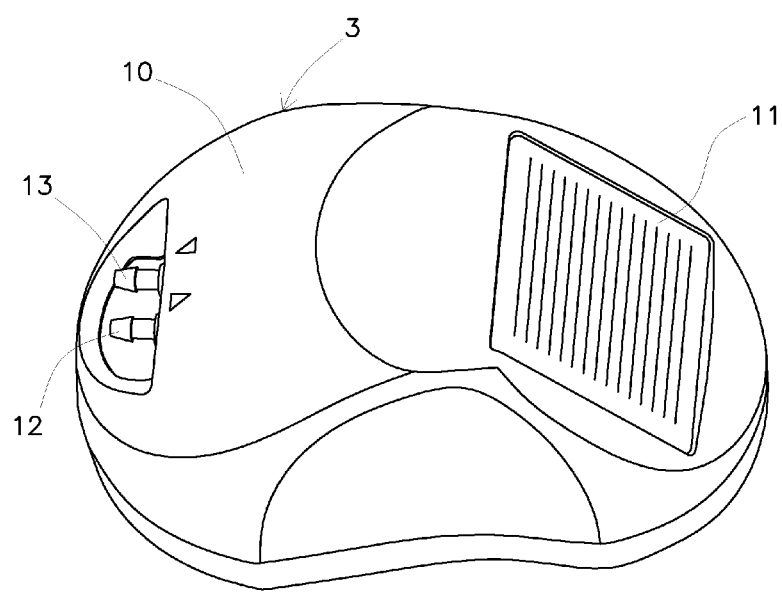
FIG. 5 shows an example of a solar panel pump which can be used in the device according to the invention.

The upper tubular lengths 7 are connected to each other by means of a crossbar 9 (FIGS. 1-3), which supports the solar panel pump 3, shown in FIG. 5, of the type described in Italian application n. 102015000026737, i.e. comprising a casing 10 containing the pumping element, rechargeable batteries and various electronic devices (not shown in FIG. 5), a solar panel 11 and attachments 12 and 13 for the drawing 2 and dispensing 4 pipes.

The horizontal tubular lengths 7 also work as support for top handles or straps 14 of a flexible bag 15 which can be filled with the liquid to be pumped, in particular irrigation water, which is surrounded by the tubular uprights 6.

The tank 1 is filled through an upper hole or mouth 18 of the bag 15, while the liquid is drawn from the tank by the pump 3 by means of the feeding pipe 2, inserted in the bag 15 through the mouth 18.

An overflow hole 20 is provided in the upper part of the bag 15, under the mouth 18, to limit the filling of liquid and prevent excessive filling from causing leakages of liquid from the mouth of the bag.

The invention claimed is:

1. A pumping device for liquids comprising a tank for liquids, from which a feeding pipe of a pump with a solar panel draws, wherein the tank consists of a supporting frame with tubular uprights and upper and lower horizontal connection lengths, which supports and surrounds a flexible bag for containing liquids and has an upper connection crossbar connected to the upper horizontal lengths of the supporting frame, on which the pump with solar panel is mounted.

2. The pumping device according to claim 1, wherein said tubular uprights are made in two parts joined in aligned position by intermediate joining elements.

3. The pumping device according to claim 1 wherein the bag has an upper filling hole or mouth in which the feeding pipe can be inserted.

4. The pumping device according to claim 3, wherein a side wall of the bag has an overflow hole in position under said month.

5. A pumping device according to claim 2, wherein the bag has an upper filling hole or mouth in which the feeding pipe can be inserted.

* * * * *